US006809909B2

United States Patent
Hou et al.

(10) Patent No.: US 6,809,909 B2
(45) Date of Patent: Oct. 26, 2004

(54) GIANT MAGNETORESISTIVE SENSOR WITH HIGH-RESISTIVITY MAGNETIC LAYERS

(75) Inventors: Chunhong Hou, Savage, MN (US); Olle G. Heinonen, Eden Prairie, MN (US); Mark T. Kief, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 344 days.

(21) Appl. No.: 10/060,519

(22) Filed: Jan. 30, 2002

(65) Prior Publication Data

US 2003/0206381 A1 Nov. 6, 2003

Related U.S. Application Data

(60) Provisional application No. 60/305,749, filed on Jul. 16, 2001.

(51) Int. Cl.[7] ............................. G11B 5/127; G11B 5/33
(52) U.S. Cl. ................................................. 360/324.11
(58) Field of Search .................. 360/324.11, 324.1, 360/324, 313, 110

(56) References Cited

U.S. PATENT DOCUMENTS

| | | | | |
|---|---|---|---|---|
| 5,898,549 A | | 4/1999 | Gill | 360/324.11 |
| 6,046,892 A | * | 4/2000 | Aoshima et al. | 360/324.11 |
| 6,278,592 B1 | * | 8/2001 | Xue et al. | 360/324.12 |
| 6,301,088 B1 | * | 10/2001 | Nakada | 360/324.11 |
| 6,317,299 B1 | * | 11/2001 | Pinarbasi | 360/324.11 |
| 6,519,121 B1 | * | 2/2003 | Gill | 360/324.11 |
| 2002/0135952 A1 | * | 9/2002 | Gill | 360/324.11 |

* cited by examiner

*Primary Examiner*—Julie Anne Watko
(74) *Attorney, Agent, or Firm*—Kinney & Lange, P.A.

(57) ABSTRACT

A giant magnetoresistive stack for use in a magnetic read head has a plurality of layers including at least one ferromagnetic layer which contributes to a giant magnetoresistive signal, a doped ferromagnetic pinned layer and a doped ferromagnetic underlayer which do not contribute to a giant magnetoresistive signal. The dopant in the doped ferromagnetic pinned layer and underlayer reduces parasitic shunting current through the giant magnetoresistive stack by providing an increase in resistivity without a decrease in magnetization.

14 Claims, 3 Drawing Sheets

GIANT MAGNETORESISTIVE SENSOR WITH HIGH-RESISTIVITY MAGNETIC LAYERS

CROSS-REFERENCE TO RELATED APPLICATION(S)

This application claims priority from Provisional Application No. 60/305,749, filed Jul. 16, 2001 entitled "Spin Valve with High-Resistive Magnetic Layers" by C. Hou and O. Heinonen.

BACKGROUND OF THE INVENTION

The present invention relates generally to a giant magnetoresistive sensor for use in a magnetic read head. In particular, the present invention relates to a giant magnetoresistive read sensor having an enhanced giant magnetoresistive response.

Giant magnetoresistive (GMR) read sensors are used in magnetic data storage systems to detect magnetically-encoded information stored on a magnetic data storage medium such as a magnetic disc. A time-dependent magnetic field from a magnetic medium directly modulates the resistivity of the GMR read sensor. A change in resistance of the GMR read sensor can be detected by passing a sense current through the GMR read sensor and measuring the voltage across the GMR read sensor. The resulting signal can be used to recover the encoded information from the magnetic medium.

A typical GMR read sensor configuration is the GMR spin valve, in which the GMR read sensor is a multi-layered structure formed of a nonmagnetic spacer layer positioned between a synthetic antiferromagnet and a ferromagnetic free layer. The magnetization of the synthetic antiferromagnet is fixed, typically normal to an air bearing surface of the GMR read sensor, while the magnetization of the free layer rotates freely in response to an external magnetic field. The synthetic antiferromagnet includes a reference layer and a pinned layer which are magnetically coupled by a coupling layer such that the magnetization direction of the reference layer is opposite to the magnetization of the pinned layer. The resistance of the GMR read sensor varies as a function of an angle formed between the magnetization direction of the free layer and the magnetization direction of the reference layer. This multi-layered spin valve configuration allows for a more pronounced magnetoresistive effect, i.e. greater sensitivity and higher total change in resistance, than is possible with anisotropic magnetoresistive (AMR) read sensors, which generally consist of a single ferromagnetic layer.

A pinning layer is typically exchange coupled to the pinned layer of the synthetic antiferromagnet to fix the magnetization of the pinned layer in a predetermined direction. The pinning layer is typically formed of an antiferromagnetic material. In antiferromagnetic materials, the magnetic moments of adjacent atoms point in opposite directions and, thus, there is no net magnetic moment in the material.

An underlayer is typically used to promote the texture of the pinning layer consequently grown on top of it. The underlayer is typically formed of a ferromagnetic material and is chosen such that its atomic structure, or arrangement, corresponds with a desired crystallographic direction.

A seed layer is typically used to enhance the grain growth of the layers consequently grown on top of it. In particular, the seed layer provides a desired grain structure and size for the underlayer.

One principal concern in the performance of GMR read sensors is the ΔR (the maximum absolute change in resistance of the GMR read sensor), which directly affects the GMR ratio. The GMR ratio (the maximum absolute change in resistance of the GMR read sensor divided by the resistance of the GMR read sensor multiplied by 100%) determines the magnetoresistive effect of the GMR read sensor. Ultimately, a higher GMR ratio yields a GMR read sensor with a greater magnetoresistive effect which is capable of detecting information from a magnetic medium with a higher linear density of data.

A key determinant of the GMR ratio is the amount of parasitic shunting current flowing through the GMR read sensor. The GMR signal produced by the GMR read sensor is generated by the current flowing through the free layer, the spacer layer, and the reference layer of the synthetic antiferromagnet. Current flowing through any other layer is a parasitic shunting current, and reduces the GMR signal. As a result, the less parasitic shunting current that is present in the GMR read sensor, the greater the GMR ratio. Parasitic shunting current can be reduced by increasing the resistivity of the layers that do not contribute directly to the GMR signal. In particular, increasing the resistivities of the pinning layer and the underlayer is especially desirable because these layers are typically formed of magnetic materials with low resistivities. In these instances, however, it is important to ensure that the magnetic properties of these layers are maintained in order for the GMR read sensor to function properly.

The present invention addresses these and other needs, and offers other advantages over current devices.

BRIEF SUMMARY OF THE INVENTION

The present invention is a giant magnetoresistive stack for use in a magnetic read head. The giant magnetoresistive stack has a plurality of layers including at least one ferromagnetic layer which contributes to a giant magnetoresistive signal, and at least one doped ferromagnetic layer which does not contribute to a giant magnetoresistive signal. The dopant in the doped ferromagnetic layer reduces parasitic shunting current through the giant magnetoresistive stack by providing an increase in resistivity without a decrease in magnetization.

DETAILED DESCRIPTION

Figure 1:
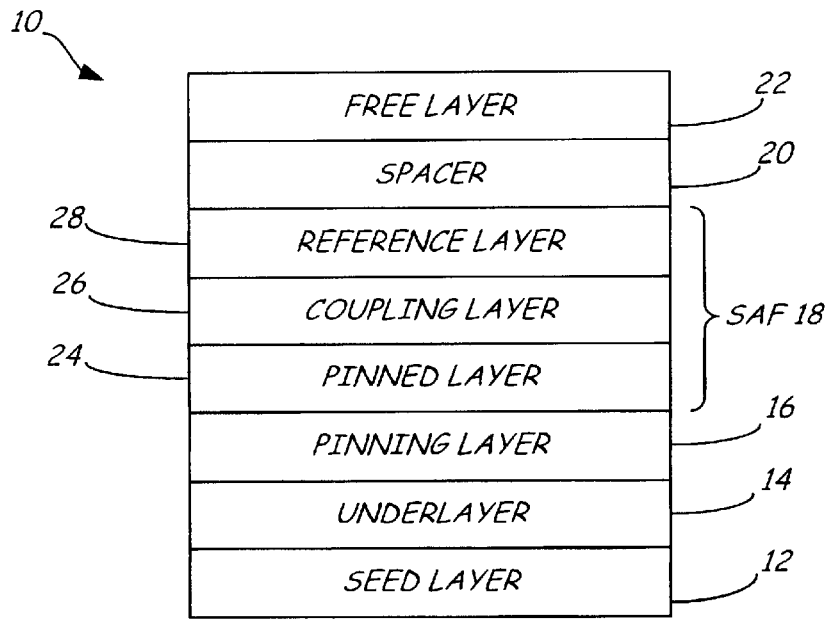
FIG. 1 is a layer diagram of a first embodiment of a giant magnetoresistive stack of the present invention.

FIG. 1 is a layer diagram of a first embodiment of a giant magnetoresistive (GMR) stack 10 of the present invention. GMR stack 10 is configured as a bottom spin valve and includes a seed layer 12, an underlayer 14, a pinning layer 16, a synthetic antiferromagnet 18, a spacer layer 20, and a free layer 22. Seed layer 12 is preferably NiFeCr or Ta. Underlayer 14 is a ferromagnetic material, preferably CoFeX or NiFeX, where X is selected from the group consisting of B, V, Cr, Mo, W and Ti, and is positioned adjacent to seed layer 12. Pinning layer 16 is an antiferromagnetic material, preferably selected from the group consisting of PtMn, IrMn, NiMn, NiO and FeMn, and is positioned adjacent to underlayer 14. Synthetic antiferromagnet 18 includes a ferromagnetic pinned layer 24, a ferromagnetic reference layer 28, and a coupling layer 26 positioned between pinned layer 24 and reference layer 28, and is positioned such that pinned layer 24 is adjacent to pinning layer 16. Coupling layer 26 is preferably ruthenium, reference layer 28 is preferably CoFe, and pinned layer 24 is preferably CoFeX, where X is selected from the group consisting of B, V, Cr, Mo, W and Ti. Free layer 22 is a ferromagnetic material, preferably CoFe or NiFe. Spacer layer 20 is a nonmagnetic material, preferably copper, and is positioned between synthetic antiferromagnet 18 and free layer 22.

The magnetization of synthetic antiferromagnet 18 is fixed while the magnetization of free layer 22 rotates freely in response to an external magnetic field emanating from a magnetic medium. Reference layer 28 and pinned layer 24 are magnetically coupled by coupling layer 26 such that the magnetization direction of reference layer 28 is opposite to the magnetization direction of pinned layer 24. The magnetization of pinned layer 24 is pinned by exchange coupling pinning layer 16 with pinned layer 24. Underlayer 14 promotes the crystallographic texture of pinning layer 16, and seed layer 12 enhances the grain growth of underlayer 14. The resistance of GMR stack 10 varies as a function of an angle that is formed between the magnetization of free layer 22 and the magnetization of reference layer 28.

The GMR signal produced by GMR stack 10 is generated by the current flowing through free layer 22, spacer layer 20, and reference layer 28. It is therefore desirable to minimize the parasitic shunting current through the layers of GMR stack 10 that are not responsible for generating the GMR signal. As a result, underlayer 14 and pinned layer 24 are doped with X, where X is selected from the group consisting of B, V, Cr, Mo, W and Ti, while free layer 22, spacer layer 20, and reference layer 28 are not doped with X. By doping underlayer 14 and pinned layer 24 with X, the resistivities of underlayer 14 and pinned layer 24 are significantly increased from about 10 $\mu\Omega$·cm (without X) to about 100 $\mu\Omega$·cm (with X), while the magnetizations of underlayer 14 and pinned layer 24 are maintained at about 2.2 Tesla. In this way, the GMR signal produced by GMR stack 10 is enhanced and, in particular, the GMR ratio and the $\Delta R$ are increased.

The composition of underlayer 14 when CoFeX is used is preferably in the range of about [Co(90)Fe(10)]X(>0) to about [Co(90)Fe(10)]X(10), and more preferably in the range of about [Co(90)Fe(10)]X(1) to about [Co(90)Fe(10)]X(3), where the numbers in parentheses represent atomic percentage, and where the atomic ratio of CoFe in brackets is maintained while the atomic percentage of X is varied. The composition of underlayer 14 when NiFeX is used is preferably in the range of about [Ni(80)Fe(20)]X(>0) to about [Ni(80)Fe(20)]X(10), and more preferably in the range of about [Ni(80)Fe(20)]X(1) to about [Ni(80)Fe(20)]X(3).

The composition of pinned layer 24 of synthetic antiferromagnet 18 is preferably in the range of about [Co(90)Fe(10)]X(>0) to about [Co(90)Fe(10)]X(10), and more preferably in the range of about [Co(90)Fe(10)]X(1) to about [Co(90)Fe(10)]X(3).

Figure 2:
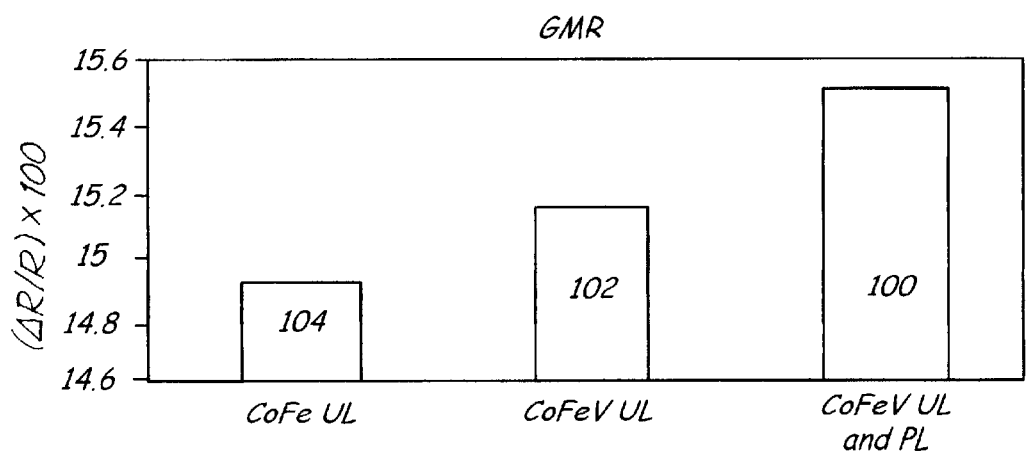
FIG. 2 is a bar graph of the GMR ratio of the first embodiment of a giant magnetoresistive stack of the present invention.

FIG. 2 is a bar graph comparing the GMR ratio of GMR stack 10 of the present invention to the GMR ratio of two similar GMR stacks. Bar 100 shows the GMR ratio (the maximum absolute change in resistance of the GMR read sensor divided by the resistance of the GMR read sensor multiplied by 100%) of GMR stack 10, where underlayer 14 and pinned layer 24 of GMR stack 10 are both CoFeV. Bar 102 shows the GMR ratio of a GMR stack similar to GMR stack 10, except pinned layer 24 is replaced with a CoFe layer (underlayer 14 remains CoFeV). Bar 104 shows the GMR ratio of a GMR stack similar to GMR stack 10, except underlayer 14 and pinned layer 24 are both replaced by CoFe layers. Bar 100 shows that the GMR ratio of GMR stack 10 is 15.49%. Bar 102 shows that if pinned layer 24 is replaced with a conventional CoFe layer, the GMR ratio drops to 15.17%. Bar 104 shows that if both underlayer 14 and pinned layer 24 are replaced with conventional CoFe layers, the GMR ratio drops to 14.94%.

Figure 3:
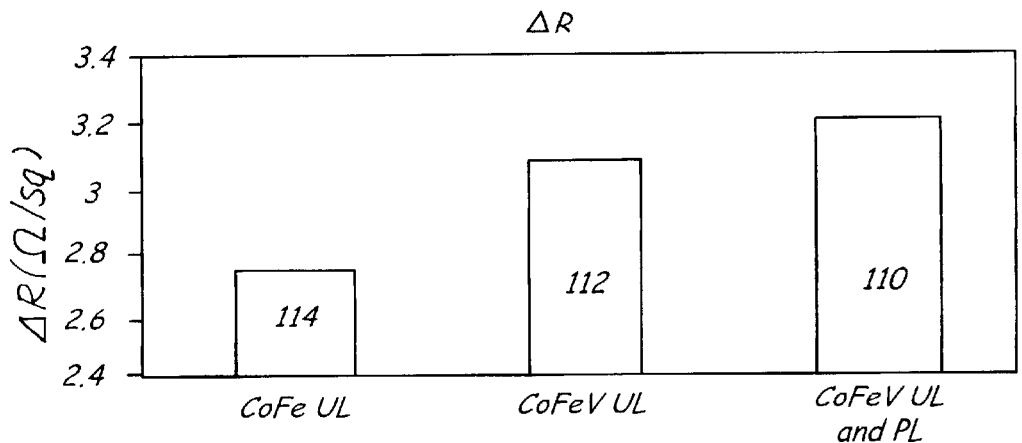
FIG. 3 is a bar graph of the ΔR of the first embodiment of a giant magnetoresistive stack of the present invention.

The bar graph of FIG. 3 corresponds to the bar graph of FIG. 2, and compares the $\Delta R$ of GMR stack 10 of the present invention to the $\Delta R$ of two similar GMR stacks. Bar 110 shows the $\Delta R$ (the maximum absolute change in resistance of the GMR read sensor) of GMR stack 10 where underlayer 14 and pinned layer 24 of GMR stack 10 are both CoFeV. Bar 112 shows the $\Delta R$ of a GMR stack similar to GMR stack 10, except pinned layer 24 is replaced with a CoFe layer (underlayer 14 remains CoFeV). Bar 114 shows the $\Delta R$ of a GMR stack similar to GMR stack 10, except underlayer 14 and pinned layer 24 are both replaced by CoFe layers. Bar 110 shows that the $\Delta R$ of GMR stack 10 is 3.22 $\Omega$/sq. Bar 112 shows that if pinned layer 24 is replaced with a conventional CoFe layer, the $\Delta R$ drops to 3.05 $\Omega$/sq. Bar 114 shows that if both underlayer 14 and pinned layer 24 are replaced with conventional CoFe layers, the $\Delta R$ drops to 2.76 $\Omega$/sq.

Figure 4:
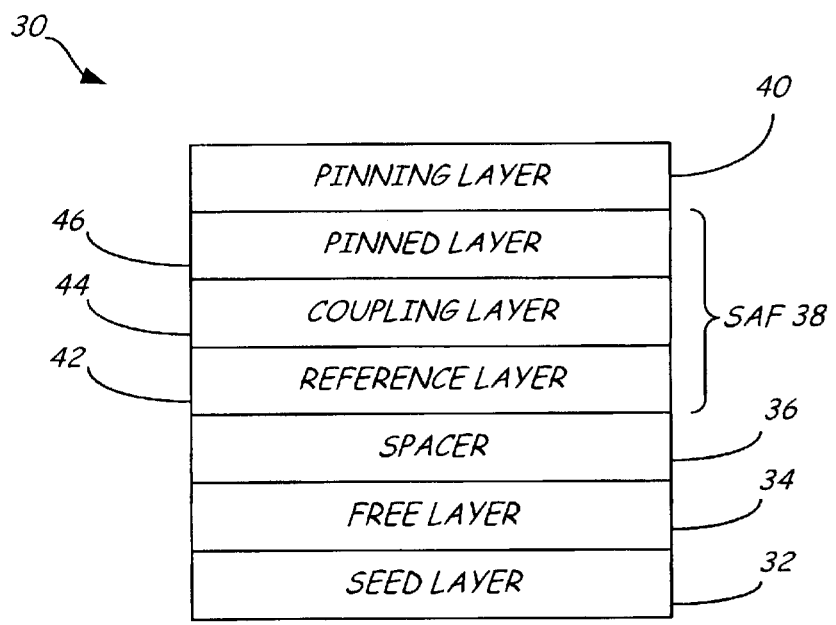
FIG. 4 is a layer diagram of a second embodiment of a giant magnetoresistive stack of the present invention.

FIG. 4 is a layer diagram of a second embodiment of a GMR stack 30 of the present invention. GMR stack 30 is configured as a top spin valve and includes a seed layer 32, a free layer 34, a spacer layer 36, a synthetic antiferromagnet 38, and a pinning layer 40. Seed layer 32 is preferably NiFeCr or Ta. Free layer 34 is a ferromagnetic material, preferably CoFe or NiFe, and is positioned adjacent to seed layer 32. Synthetic antiferromagnet 38 includes a ferromagnetic reference layer 42, a ferromagnetic pinned layer 46, and a coupling layer 44 positioned between reference layer 42 and pinned layer 46. Reference layer 42 is preferably CoFe, coupling layer 26 is preferably ruthenium, and pinned layer 46 is preferably CoFeX, where X is selected from the group consisting of B, V, Cr, Mo, W, and Ti. Pinning layer 40 is an antiferromagnetic material, preferably selected from the group consisting of PtMn, IrMn, NiMn, NiO and FeMn, and is positioned adjacent to pinned layer 46 of synthetic antiferromagnet 38. Spacer layer 36 is a nonmagnetic material, preferably copper, and is positioned between free layer 34 and synthetic antiferromagnet 38.

The magnetization of synthetic antiferromagnet 38 is fixed while the magnetization of free layer 34 rotates freely in response to an external magnetic field emanating from a magnetic medium. Reference layer 42 and pinned layer 46 are magnetically coupled by coupling layer 44 such that the magnetization direction of reference layer 42 is opposite to the magnetization direction of pinned layer 46. The magnetization of pinned layer 46 is pinned by exchange coupling pinning layer 40 with pinned layer 46. Seed layer 32 promotes the crystallographic texture and enhances the grain growth of free layer 34. The resistance of GMR stack 30 varies as a function of an angle that is formed between the magnetization of free layer 34 and the magnetization of reference layer 42.

The GMR signal produced by GMR stack 30 is generated by the current flowing through free layer 34, spacer layer 36, and reference layer 42. It is therefore desirable to minimize the parasitic shunting current through the layers of GMR stack 30 that are not responsible for generating the GMR signal. As a result, pinned layer 46 is doped with X, where X is selected from the group consisting of B, V, Cr, Mo, W and Ti, while free layer 34, spacer layer 36, and reference layer 42 are not doped with X. By doping pinned layer 46 with X, the resistivity of pinned layer 46 is significantly increased from about 10 $\mu\Omega$·cm (without X) to about 100 $\mu\Omega$·cm (with X), while the magnetization of pinned layer 46 is maintained at about 2.2 Tesla. In this way, the GMR signal produced by GMR stack 30 is enhanced and, in particular, the GMR ratio and the $\Delta R$ are increased.

The composition of pinned layer 46 of synthetic antiferromagnet 38 is preferably in the range of about [Co(90)Fe(10)]X(>0) to about [Co(90)Fe(10)]X(10), and more preferably in the range of about [Co(90)Fe(10)]X(1) to about [Co(90)Fe(10)]X(3).

Figure 5:
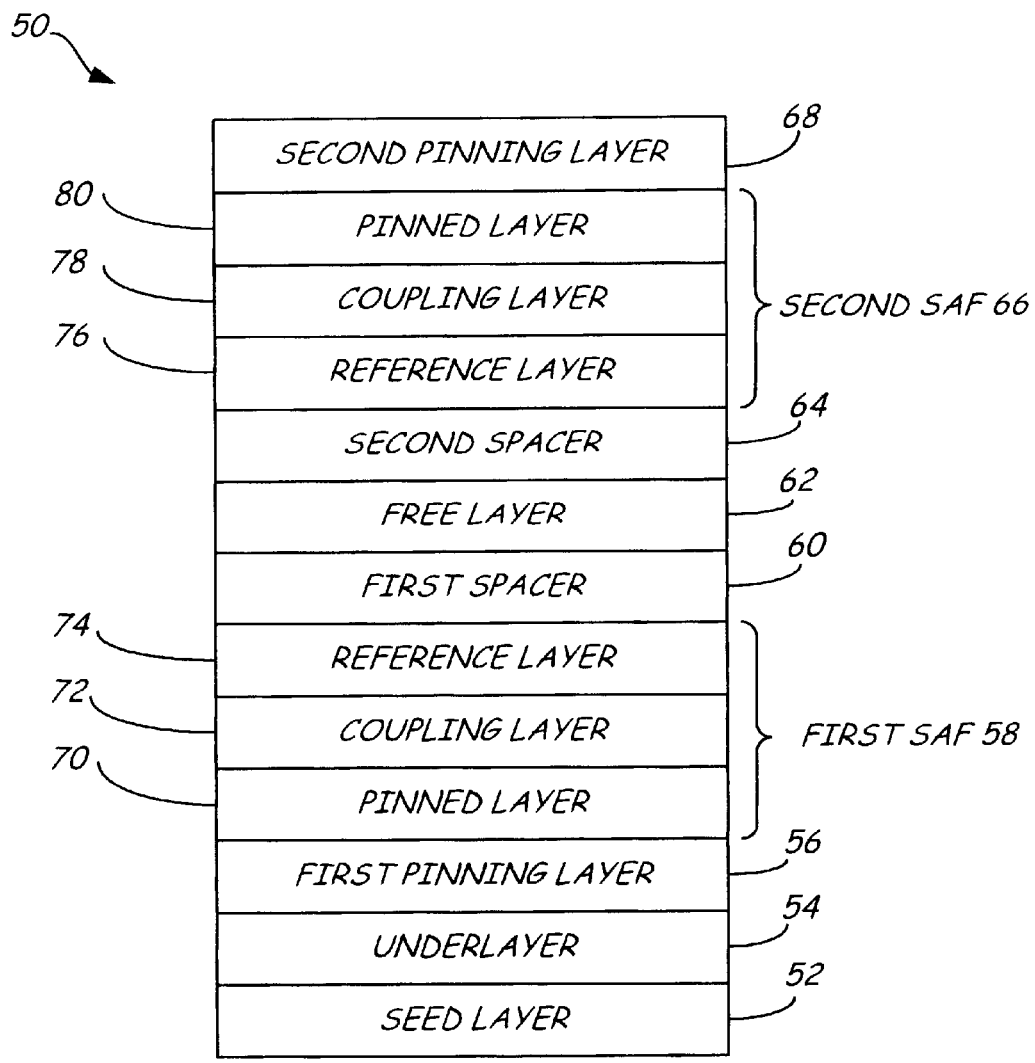
FIG. 5 is a layer diagram of a third embodiment of a giant magnetoresistive stack of the present invention.

FIG. 5 is a layer diagram of a third embodiment of a giant magnetoresistive (GMR) stack 50 of the present invention. GMR stack 50 is configured as a dual spin valve and includes a seed layer 52, an underlayer 54, a first pinning layer 56, a first synthetic antiferromagnet 58, a first spacer layer 60, a free layer 62, a second spacer layer 64, a second synthetic antiferromagnet 66, and a second pinning layer 68. Seed layer 52 is preferably NiFeCr or Ta. Underlayer 54 is a ferromagnetic material, preferably CoFeX or NiFeX, where X is selected from the group consisting of B, V, Cr, Mo, W, and Ti, and is positioned adjacent to seed layer 52. First pinning layer 56 is an antiferromagnetic material, preferably selected from the group consisting of PtMn, IrMn, NiMn, NiO and FeMn, and is positioned adjacent to underlayer 54. First synthetic antiferromagnet 58 includes a ferromagnetic pinned layer 70, a ferromagnetic reference layer 74, and a coupling layer 72 positioned between pinned layer 70 and reference layer 74, and is positioned such that pinned layer 70 is adjacent to first pinning layer 56. Coupling layer 72 is preferably ruthenium, reference layer 74 is preferably CoFe, and pinned layer 70 is preferably CoFeX, where X is selected from the group consisting of B, V, Cr, Mo, W, and Ti. Free layer 62 is a ferromagnetic material, preferably CoFe or NiFe. First spacer layer 60 is a nonmagnetic material, preferably copper, and is positioned between first synthetic antiferromagnet 58 and free layer 62. Second synthetic antiferromagnet 66 includes a ferromagnetic reference layer 76, a ferromagnetic pinned layer 80, and a coupling layer 78 positioned between reference layer 76 and pinned layer 80. Reference layer 76 is preferably CoFe, coupling layer 78 is preferably ruthenium, and pinned layer 80 is preferably CoFeX, where X is selected from the group consisting of B, V, Cr, Mo, W, and Ti. Second pinning layer 68 is an antiferromagnetic material, preferably selected from the group consisting of PtMn, IrMn, NiMn, NiO and FeMn, and is positioned adjacent to pinned layer 80 of second synthetic antiferromagnet 66. Second spacer layer 64 is a nonmagnetic material, preferably copper, and is positioned between free layer 62 and second synthetic antiferromagnet 66.

The magnetizations of first and second synthetic antiferromagnets 58 and 66 are fixed while the magnetization of free layer 62 rotates freely in response to an external magnetic field emanating from a magnetic medium. Reference layer 74 and pinned layer 70 are magnetically coupled by coupling layer 72 such that the magnetization direction of reference layer 74 is opposite to the magnetization direction of pinned layer 70. The magnetization of pinned layer 70 is pinned by exchange coupling first pinning layer 56 with pinned layer 70. Underlayer 54 promotes the crystallographic texture of first pinning layer 56, and seed layer 52 enhances the grain growth of underlayer 54. Reference layer 76 and pinned layer 80 are magnetically coupled by coupling layer 78 such that the magnetization direction of reference layer 76 is opposite to the magnetization direction of pinned layer 80. The magnetization of pinned layer 80 is pinned by exchange coupling second pinning layer 68 with pinned layer 80. The resistance of GMR stack 50 varies as a function of the angles that are formed between the magnetization of free layer 62 and the magnetizations of reference layers 74 and 76.

The GMR signal produced by GMR stack 50 is generated by the current flowing through free layer 62, spacer layers 60 and 64, and reference layers 74 and 76. It is therefore desirable to minimize the parasitic shunting current through the layers of GMR stack 50 that are not responsible for generating the GMR signal. As a result, underlayer 54 and pinned layers 70 and 80 are doped with X, where X is selected from the group consisting of B, V, Cr, Mo, W and Ti, while free layer 62, spacer layers 60 and 64, and reference layers 74 and 76 are not doped with X. By doping underlayer 54 and pinned layers 70 and 80 with X, the resistivities of underlayer 54 and pinned layers 70 and 80 are significantly increased from about 10 $\mu\Omega$·cm (without X) to about 100 $\mu\Omega$·cm (with X), while the magnetizations of underlayer 54 and pinned layers 70 and 80 are maintained at about 2.2 Tesla. In this way, the GMR signal produced by GMR stack 50 is enhanced and, in particular, the GMR ratio and the $\Delta R$ are increased.

The composition of underlayer 54 when CoFeX is used is preferably in the range of about [Co(90)Fe(10)]X(>0) to about [Co(90)Fe(10)]X(10), and more preferably in the range of about [Co(90)Fe(10)]X(1) to about [Co(90)Fe(10)]X(3). The composition of underlayer 54 when NiFeX is used is preferably in the range of about [Ni(80)Fe(20)]X(>0) to about [Ni(80)Fe(20)]X(10), and more preferably in the range of about [Ni(80)Fe(20)]X(1) to about [Ni(80)Fe(20)]X(3).

The composition of pinned layer 70 of first synthetic antiferromagnet 58 is preferably in the range of about [Co(90)Fe(10)]X(>0) to about [Co(90)Fe(10)]X(10), and more preferably in the range of about [Co(90)Fe(10)]X(1) to about [Co(90)Fe(10)]X(3). Similarly, the composition of pinned layer 80 of second synthetic antiferromagnet 66 is preferably in the range of about [Co(90)Fe(10)]X(>0) to about [Co(90)Fe(10)]X(10), and more preferably in the range of about [Co(90)Fe(10)]X(1) to about [Co(90)Fe(10)]X(3).

In summary, the present invention introduces a GMR read sensor with at least one doped ferromagnetic layer which does not contribute to a GMR signal. The doped ferromagnetic layer reduces parasitic shunting current, and thus enhances the GMR response of the GMR read sensor. The dopant in the doped ferromagnetic layer is preferably selected from the group consisting of B, V, Cr, Mo, W, and Ti. The doped ferromagnetic layer may be a pinned layer, an S underlayer, or some other layer which does not contribute to a GMR signal. As a result, the present invention allows the resistivities of the ferromagnetic layers which do not contribute to a GMR signal to be increased without increasing the resistivities of the ferromagnetic layers which do contribute to a GMR signal. Furthermore, the present invention allows the resistivities of the ferromagnetic layers which do not contribute to a GMR signal to be increased without decreasing the magnetizations of these layers.

Although the present invention has been described with reference to preferred embodiments, workers skilled in the art will recognize that changes may be made in form and detail without departing from the spirit and scope of the invention.

What is claimed is:

1. A giant magnetoresistive stack for use in a magnetic read head, the giant magnetoresistive stack comprising:
   a ferromagnetic free layer having a rotatable magnetic moment;
   a first synthetic antiferromagnet comprising:
      a ferromagnetic reference layer having a fixed magnetic moment;
      a doped ferromagnetic pinned layer, wherein the pinned layer is doped with a dopant selected from the group consisting of B, V, Cr, Mo, W, and Ti; and
      coupling layer positioned between the reference layer and the pinned layer;
   a first nonmagnetic spacer layer positioned between the free layer and the first synthetic antiferromagnet; and
   a first antiferromagnetic pinning layer positioned adjacent to the first synthetic antiferromagnet;
   a doped ferromagnetic underlayer positioned adjacent to the first pinning layer, wherein the underlayer is doped with a dopant selected from the group consisting of B, V, Cr, Mo, W, and Ti; and
   a seed layer positioned adjacent to the underlayer.

2. The giant magnetoresistive stack of claim 1 wherein the doped ferromagnetic pinned layer of the first synthetic antiferromagnet is CoFeX, wherein X is the dopant.

3. The giant magnetoresistive stack of claim 2 wherein an atomic percentage of X in the CoFeX pinned layer of the first synthetic antiferromagnet is in the range of greater than 0 to about 10.

4. The giant magnetoresistive stack of claim 1 wherein the doped ferromagnetic underlayer is CoFeX, wherein X is the dopant.

5. The giant magnetoresistive stack of claim 4 wherein an atomic percentage of X in the CoFeX underlayer is in the range of greater than 0 to about 10.

6. The giant magnetoresistive stack of claim 1 wherein the doped ferromagnetic underlayer is NiFeX, wherein X is the dopant.

7. The giant magnetoresistive stack of claim 6 wherein an atomic percentage of X in the NiFeX underlayer is in the range of greater than 0 to about 10.

8. The giant magnetoresistive stack of claim 1 and further comprising:
   a second synthetic antiferromagnet comprising:
      a ferromagnetic reference layer having a fixed magnetic moment;
      a doped ferromagnetic pinned layer, wherein the pinned layer is doped with a dopant selected from the group consisting of B, V, Cr, Mo, W, and Ti; and
      a coupling layer positioned between the reference layer and the pinned layer;
   a second nonmagnetic spacer layer positioned between the free layer and the second synthetic antiferromagnet; and
   a second antiferromagnetic pinning layer positioned adjacent to the second synthetic antiferromagnet.

9. The giant magnetoresistive stack of claim 8 wherein the doped ferromagnetic pinned layer of the second synthetic antiferromagnet is CoFeX, wherein X is the dopant.

10. The giant magnetoresistive stack of claim 9 wherein an atomic percentage of X in the CoFeX pinned layer of the second synthetic antiferromagnet is in the range of greater than 0 to about 10.

11. The giant magnetoresistive stack of claim 1 wherein the doped ferromagnetic underlayer is CoFeX, wherein X is the dopant.

12. The giant magnetoresistive stack of claim 11 wherein an atomic percentage of X in the CoFeX underlayer is in the range of greater than 0 to about 10.

13. The giant magnetoresistive stack of claim 1 wherein the doped ferromagnetic underlayer is NiFeX, wherein X is the dopant.

14. The giant magnetoresistive stack of claim 13 wherein an atomic percentage of X in the NiFeX underlayer is in the range of greater than 0 to about 10.

* * * * *

UNITED STATES PATENT AND TRADEMARK OFFICE
CERTIFICATE OF CORRECTION

PATENT NO.    : 6,809,909 B2
DATED         : October 26, 2004
INVENTOR(S)   : Chunhong Hou et al.

It is certified that error appears in the above-identified patent and that said Letters Patent is hereby corrected as shown below:

Title page,
Item [54], Title, delete "GIANT MAGNETORESISTIVE SENSOR WITH HIGH-RESISTIVITY MAGNETIC LAYERS", insert -- GIANT MAGNETORESISTIVE SENSOR WITH HIGH-RESISTIVITY DOPED UNDERLAYER AND DOPED PINNED LAYER --

Signed and Sealed this

Eighth Day of March, 2005

JON W. DUDAS
*Director of the United States Patent and Trademark Office*